Nov. 12, 1946.   W. C. BARNES ET AL   2,410,803
METHOD AND APPARATUS FOR DETECTING FLAWS IN RAILS
Filed April 8, 1940   6 Sheets-Sheet 3

INVENTORS
Walter C. Barnes
BY Henry W. Keevil
Mann, Brown & Co.
ATTORNEYS.

Nov. 12, 1946. W. C. BARNES ET AL 2,410,803
METHOD AND APPARATUS FOR DETECTING FLAWS IN RAILS
Filed April 8, 1940 6 Sheets-Sheet 5

INVENTORS
Walter C. Barnes
BY Henry W. Keevil
Mann, Brown & Co.
ATTORNEYS

Patented Nov. 12, 1946

2,410,803

UNITED STATES PATENT OFFICE 2,410,803

METHOD AND APPARATUS FOR DETECTING FLAWS IN RAILS

Walter C. Barnes, Lake Bluff, and Henry W. Keevil, Highland Park, Ill.

Application April 8, 1940, Serial No. 328,516

27 Claims. (Cl. 175—183)

This invention relates to rail flaw detector cars for locating flaws in track. This application is a continuation-in-part of application Serial No. 25,586 which has been abandoned and of application Serial No. 330,210.

In the past, it has always been assumed that indications recorded by flaw detecting apparatus at the exact point where the rail surface shows an obvious imperfection, such as a driver burn, shelly spot, flowed rail, or the like, were caused by the surface defect, and the car operator would pass the rail without further inspection. This has applied to rail flaw detector cars using the electro-inductive system of testing as well as to cars employing the residual magnetism system of testing. In both systems of testing—the former passing a uni-directional electric current through the rail and then detecting variations in the magnetic field surrounding the rail, and the latter passing a strong magnetic flux through the rail and then detecting the presence of residual magnetism in the vicinity of flaws—the sensitivity of the detecting apparatus is necessarily limited by the surface condition of the rail, for it has been found by experience that certain surface conditions, such as driver burns, corrugations, shelly spots, and the like, cause disturbances in the magnetic field in their vicinity which result in an indication being made on the flaw recording device.

As a consequence, the amplifiers associated with the recording apparatus are set so that the record is comparatively clean, except for relatively large surface imperfections; and in some instances it is even impossible to cut down the sensitivity of the amplifiers to the extent necessary for this purpose without destroying their required sensitivity for the detection and indication of flaws.

It has been found that flaws are in some instances located directly beneath such surface imperfections as burns, shelly rail, and the like. It is for that reason that one of the principal objects of this invention is to provide flaw detecting equipment that is capable of indicating the presence of fissures beneath surface imperfections of this kind.

Broadly stated, other objects of the invention are as follows:

To provide flaw detecting equipment which will accurately and reliably indicate the presence of flaws but will not be responsive to magnetic conditions created by surface imperfections on the top surface of the rail head;

To provide a detecting unit that normally operates either underneath the rail head or adjacent to the gauge side of the rail head, where there are relatively few, if any, surface imprefections of a nature which can produce false indications;

To provide a flaw detecting unit which, though normally operating underneath the rail head, has the ability to automatically move into the flange way provided adjacent to the rail head whenever an obstruction makes it impossible to test under the rail head;

To provide means for testing the gauge side of the rail head and to automatically move to a position clear of track obstructions whenever they are encountered by the detecting unit;

To provide a detecting unit which is so mounted and controlled that it is automatically moved out of the way of track obstructions but is yieldingly urged into normal operating position so that, after the obstruction has been passed by the car, it will resume its normal operating position;

To provide novel ways for setting up characteristic magnetic conditions in the vicinity of flaws and for detecting their presence; and To otherwise provide flaw detecting apparatus that is more accurate and reliable for locating flaws in rail.

Other objects and advantages will become apparent as the disclosure proceeds and the description is read in conjunction with the accompanying drawings, in which

Figs. 13 and 14 are vertical sectional views taken on the line 13—13 of Fig. 10, the former figure showing the detecting unit in operative position below the rail head and the latter figure showing the detecting unit in the position which it assumes within the flange way whenever the feeler strikes an obstruction, such as a switch, angle bar, or the like;

Fig. 24 shows a modified mounting for a detecting unit intended to cooperate with the under surface of the rail head.

It will be understood that the disclosure of certain preferred forms of this invention is made in compliance with Section 4888 of the Revised Statutes and that the appended claims are to be construed as broadly as the prior art will permit.

GENERAL ORGANIZATION

Figures 1, 2, 3, 4:
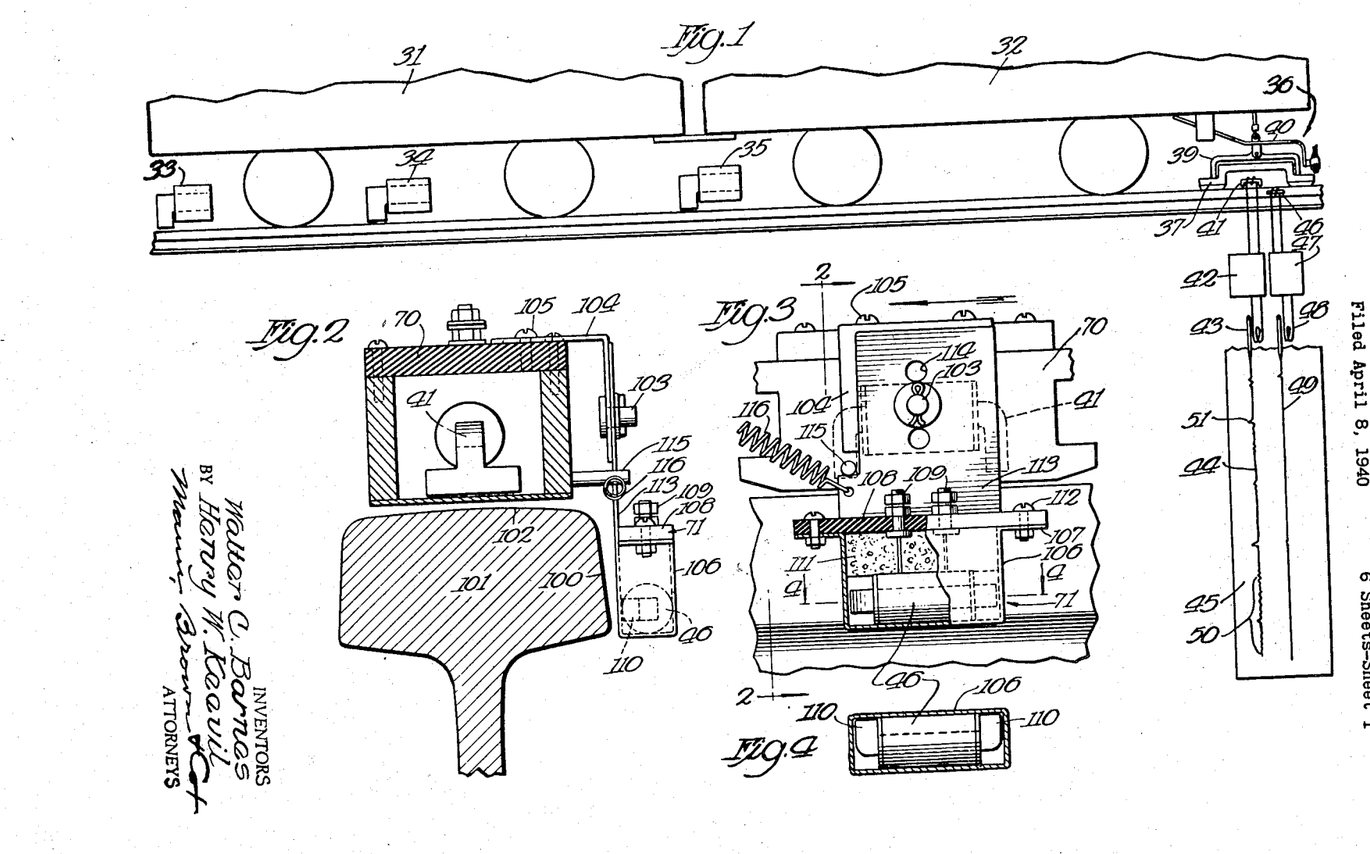
Fig. 1 is a diagrammatic side elevational view of a rail flaw detector car employing the residual magnetism method of testing, showing the improved detecting unit mounted on the detector carriage.
Fig. 2 is a vertical sectional view taken on the line 2—2 of Fig. 3, showing a form of the invention in which the detecting unit cooperates with the gauge side of the rail head.
Fig. 3 is a side elevational view of the detecting unit shown in Fig. 2.
Fig. 4 is a sectional view taken on the line 4—4 of Fig. 3.

The invention has been shown applied to a detector car, consisting of a tow section 31 and a trailer section 32, the former carrying rail energizing magnets 33 and 34 and the latter carrying a third rail energizing magnet 35. These magnets pass a strong magnetic flux longitudinally through the rail, causing characteristic magnetic conditions to be set up in the vicinity of transverse fissures; and these characteristic magnetic conditions are adapted to be picked up by a detector, generally designated 36, which comprises a detector carriage 37 adapted to travel along the rail, guided by gauge runners 38. A yoke 39, straddling the carriage 37 is horizontally and vertically pinned to an arm 40, carried by the trailer car 32. The usual pick-up consists of a longitudinal coil 41 feeding to an amplifier 42, which in turn operates a recording pen 43 that traces a line 44 on a record tape 45. The present invention associates with the pick-up an additional coil 46 (or the pick-up 46 may be used alone) which feeds to an amplifier 47, operating a recording pen 48 that traces a record line 49 on the tape 45, the latter being continuously moved at a speed proportional to car speed.

Inasmuch as surface defects on the rail cause what are known as false indications (indicated, by way of example, by the bracketed jagged portion 50 of the record line 44), it is usually necessary to cut down the sensitivity of the amplifier 42 until the record line 44 is substantially devoid of these ragged portions. Even then, indications, such as the one shown at 51, corresponding in all respects to a flaw indication, are produced on the record tape by such surface defects as driver burns, shelly rail, and the like; and there is the ever present danger that a true fissure will be missed when the sensitivity to the amplifier is cut down to the extent necessary to produce a relatively "clean" record.

The above condition did not exist on all types of rail, but there is at least a sufficient amount of rail in track which produces this difficulty to make the problem one of real concern. It is present to even a greater extent in the electro-inductive system of testing, where the detection of flaws is accomplished by a detector coil responsive to variations in the magnetic flux around that portion of the rail through which a strong uni-directional electric current is flowing.

The present invention overcomes the need for reducing the sensitivity of the amplifiers by testing that portion of the rail head which lies below the top surface thereof, which surface is the only portion of the rail head that, by and large, has surface imperfections causing false indications. As a result, the sensitivity of the amplifier may be greatly increased, thereby increasing by a proportional amount the ability of the detecting apparatus to locate fissures.

The detecting unit may be mounted in cooperation either with the gauge side of the rail head, as shown in Figs. 1–4, inclusive, or with the under surface of the rail head, as shown in Figs. 7–15, inclusive; and preferably, when the detecting unit is mounted below the rail head, means are provided so that it automatically assumes a testing position adjacent to the gauge side of the rail head whenever track obstructions prevent continued testing along the under surface of the head.

DETECTOR CARRIAGE AND ITS SUSPENSION FROM THE CAR

Figure 5:
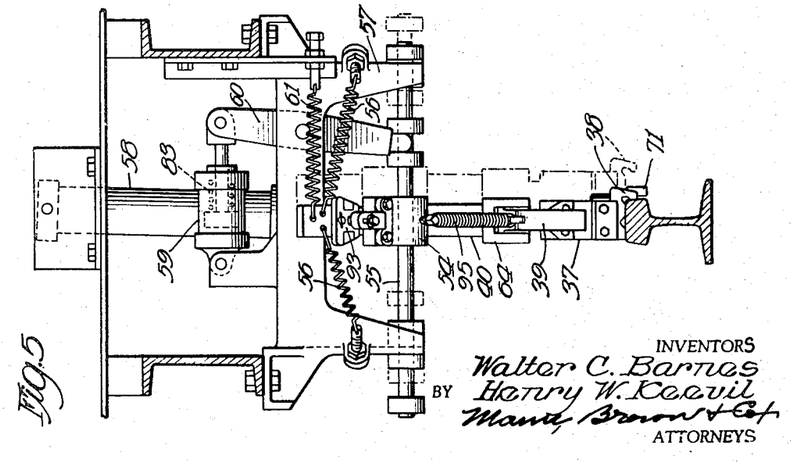
Fig. 5 is a view taken from the rear of the detector car showing the preferred mounting for the detector carriage.
Figure 6:
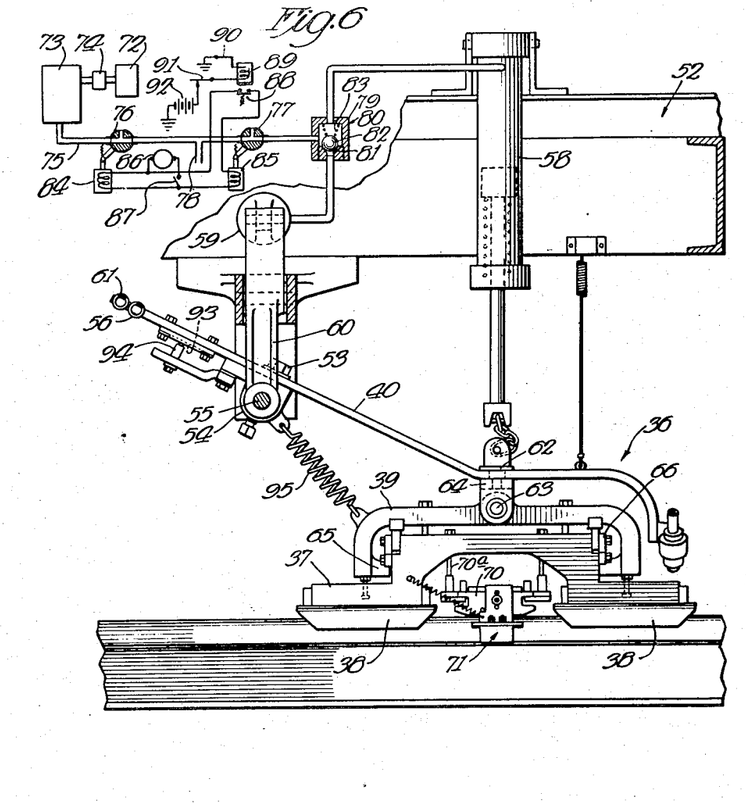
Fig. 6 is a side elevational view of the detector carriage mount, the detecting unit for the gauge side of the rail head being shown mounted on the customary pick-up box.

Referring now to Figs. 5 and 6 particularly, it will be seen that the detector 36 is suspended from the car underframe, generally indicated at 52, by means of the trailing arm 40, this arm being vertically pivoted at 53 to a block 54 mounted on a horizontal shaft 55 that is adapted to be moved laterally from the position shown in full lines to the position shown in dotted lines, and vice versa. The arm 40 is normally held at right angles to the shaft 55 by equalizing springs 56 adjustably attached to the yoke frame 57.

The carriage 36 is raised and lowered with respect to the rail by an air cylinder 58, and the operation of this cylinder is so coordinated with the operation of a transverse cylinder 59 that, when the carriage is lowered to the rail, it moves in a substantially vertical plane, as shown by dotted lines in Fig. 5, to a position in which the gauge runner 38 is well inside the gauge edge of the rail, after which the cylinder 59 functions through a lever 60 to move the shaft 55, block 54, and arm 40 laterally to the left (Fig. 5) until the gauge runner 38 is against the gauge side of the rail head. The normal operating position of the carriage is shown in full lines in Fig. 5.

When the carriage 36 is moved laterally into operative positive after striking the rail head, as above described, a spring 61, attached to the upper end of the arm 40, is placed in tension, thereby yieldingly holding the carriage 36 in its proper lateral position with respect to the rail with the gauge runners 38 riding on the gauge side of the rail head.

The yoke 39 is vertically pinned at 62 to the arm and horizontally pivoted at 63 to a connecting clevis 64, so that the yoke may align itself in all directions with respect to any irregularities in the surface of the rail. The yoke extends around the carriage 37 and has inwardly extending lugs 65, which cooperate with centering plates 66 to lift the carriage from the rail whenever the arm 40 is raised by the cylinder 58. In normal running position, the rear lug 65 merely pushes the carriage along the rail, and downwardly extending studs 67, engaging vertical pockets 68 in the carriage, transmit the inwardly directed force produced by the spring 61 to the detector carriage to hold it in the desired position on the rail head. The weight of the carriage itself, together with the weight of the arm 40 and yoke 39 that is transmitted to the carriage through rollers 69, is sufficient to give the carriage good riding qualities on the rail.

The pick-up box 70, which has been used in the past to house the coil 41 (Fig. 1), cooperating with the top surface of the rail, is supported from the carriage 37 by bolts 70a. The housing for the gauge coil 46 is generally indicated at 71.

CONTROL AND OPERATION OF DETECTOR CARRIAGE

The coordination between the cylinders 58 and 59 is accomplished by a control system, generally indicated in Fig. 6. It consists of a compressor 72, which maintains an air storage tank 73 under desired pressures through a check valve 74. The air line 75 from the storage tank 73 passes through a main valve 76, and then branches out to auxiliary valves, controlling the detector carriages on each side of the car. Only one of these auxiliary valves is shown at 77, it being understood that the branch air conduit 78 extends to similar equipment on the other side of the car.

Whenever the valves 76 and 77 are opened to permit air under pressure to enter the chamber 79 of a time-delay device 80, the air under pressure immediately enters the cylinder 58 to lower the detector carriage to the rail; and, inasmuch as a spring 83 normally holds the piston in the cylinder 59 (Fig. 5) in such a position that the shaft 55 is in its dotted line position, the carriage in its downward movement travels in a vertical plane downwardly until it strikes the rail. After a predetermined time interval, determined by the bleeding of air through a restricted channel 81 in the seat of ball valve 82 that is normally held closed by a spring 83, the air pressure in the cylinder 59 increases sufficiently so that it overcomes the pressure of the spring 83 and causes the lever 60 to be rocked to move the detector carriage with its supporting arm to the full line position shown in Fig. 5. When the valve 77 is rotated to connect the chamber 79 with atmosphere, the ball valve 82 is unseated, and both cylinders operate by means of the springs associated with the incased pistons to lift the carriage to a position in which both carriage and arm 40 are positioned inwardly of the plane which they normally occupy when the carriage is in running position. Subsequent opening of the valves 76 and 77 produces the same sequence of operation as previously described for the lowering of the carriage.

The main valve 76 and auxiliary valve 77 are preferably controlled by electrical means, and this may be accomplished by providing solenoids 84 and 85 and operatively connecting them to operating arms on the valves 76 and 77 respectively. The solenoids 84 and 85 are connected across a source of E. M. F., such as a generator 86, and a hand switch 87 is provided for closing the circuit which controls the two solenoids.

The action of the solenoid 85 is also dependent upon the position of an electromagnetic switch 88 which, when energized, closes the circuit through the solenoid valve 85. The electromagnetic switch 88 includes a solenoid 89, which is in series with a safety switch 90 and a hand switch 91, the circuit receiving its E. M. F. from a small battery 92. Obviously, whenever either the safety switch 90 or hand switch 91 are opened, the solenoid valve 85 is de-energized, thereby moving the valve 77 to a position in which the chamber 79 of the time-delay device is connected to atmosphere.

The safety switch 90 is carried at the upper end of the arm 40, and it consists of a metal plate 93, which is in contact with an electrical contact 94 carried by the block 54 as long as the arm 40 remains within given limits of angular movement about pivot 53. If for any reason the carriage should become derailed, as for example by erroneously following a switch rail or the like, the angular movement of the arm 40 about the pivot 53 will cause the plate 93 to move away from the contact 94, whereupon the solenoid 89 of the electromagnetic switch 88 is de-energized to cause the solenoid valve 77 to release the air from the cylinders 58 and 59. The springs within these cylinders automatically lift the carriage, whereupon the equalizing springs 56 bring the arm 40 back to normal position in alignment with the rail and close the contact between the plate 93 and the contact 94. Preferably, the electromagnetic switch 88 is of the slow-make, quick-break type, so that the switch 88 does not actually close until a few seconds have elapsed after the solenoid 89 is energized, thus giving the carriage time to steady itself before being lowered again to the rail. The spring 95, extending between the yoke 39 and the block 54, assists in aligning the carriage preparatory to again being lowered.

DETECTING UNIT

*Gauge mount (Figs. 1–6, inclusive)*

A simple form of mounting a detecting unit for cooperation with the gauge side 100 of the rail head 101 is shown in Figs. 1–6, inclusive. The pick-up box 70, cooperating with the top surface 102 of the rail head, has mounted within it the conventional longitudinal coil 41 operating the pen 43 to produce the record line 44. The gauge pick-up 46 may be supported from the box 70 or some other portion of the carriage in various ways; and, as here shown, the coil is mounted in a housing 71 pivotally supported at 103 from a bracket 104 adjustably secured at 105 to the pick-up box 70. The housing 71 is preferably made as light as possible so that it can be easily moved by obstructions to a position that will clear them, and preferably it is made of light gauge copper sheeting bent to form a box-like enclosure 106 at its lower end, which receives the detector coil 46. The box is flanged as shown at 107 to receive an insulating closure plate 108 upon which terminals 109 are mounted. The coil 46 may be held rigidly in place at the bottom of the housing, either by filling the housing with wax after the coil has been placed in position with the core legs 110 facing the gauge edge 100 of the rail, or a small piece of sponge rubber 111 may be compressed against the coil 46 by forcing the closure plate 108 against the flanges 107 by attaching screws 112.

The upper portion of the housing 71 extends upwardly to form the arm 113 of the pendulum mounting of the coil 46, the pin 103 being insertable selectively in any one of several holes 114 provided in the arm 113. Hence, the position of the coil 46 with respect to the top surface of the rail head may be chosen to suit conditions.

The housing is free to swing rearwardly about the pin 103 in the event that it strikes an obstacle, and it is yieldingly urged forwardly against a stop 115 by means of a spring 116.

The width of the box enclosure 106 and its spacing from the gauge side of the rail head are such that the gauge coil will normally ride through all track obstructions, such as highway crossings, switches, frogs, and the like, in the flange way that is provided in standard track to receive the wheel flanges of the rolling stock traveling over the rail. Occasionally, however, a stone or some foreign object will become caught in the flange way, and the pendulum mounting of the detector coil avoids any damage being done to the coil by reason of its striking such an obstacle.

Preferably, the coil 46 is wound with 7500 turns of No. 36 enameled wire; and the core, by way of example, may be one-quarter inch in cross section with the legs 110 having a total depth, top to bottom, of three-eighths of an inch.

The record produced by a coil positioned adjacent to the gauge side of the rail head is exceptionally clean and free from false indications, it having been determined by actual test that the surface imperfections which ordinarily cause false indications do not affect a pick-up located on the gauge side of the rail head. As a result, the sensitivity of the amplifier 47 may be stepped up considerably, and it is therefore possible to locate fissures, some of which may not be indicated at all by the coil 41, due to the lower sensitivity of its amplifier, and others which, though indicated on the record line 44, would normally be passed by as caused by some surface imperfection on the top surface of the rail. Hence, in reading a record of the type shown in Fig. 1, the operator will interpret the indications made by the pen 43 in the same manner as always, but whenever a corresponding indication is made in the record 49, or whenever an indication of any kind is made on the record line 49, the operator will hand-check the rail to verify the finding of a fissure. In other words, every indication on the record line 49 will normally indicate the presence of a fissure, whereas certain indications on line 44, where there is no corresponding indication on line 49, would be interpreted as caused by surface imperfections in the rail.

Figures 16, 17, 18, 19, 20, 21, 22, 23, 25:
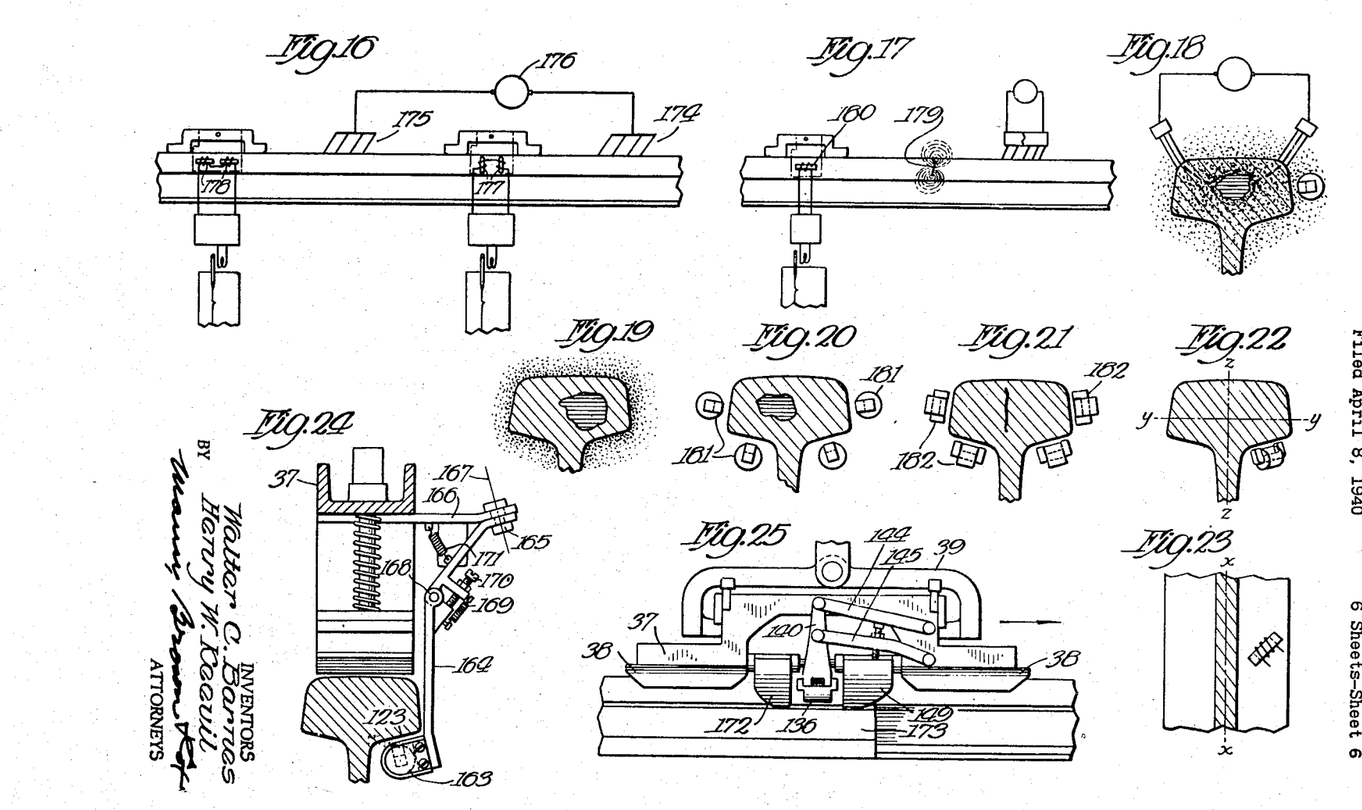
Fig. 16 is a diagrammatic view showing how the detecting unit may be adapted to the electro-inductive system of testing, in which the pick-up is placed either between the current brushes or behind them, in which latter case the detector coils respond to the residual magnetism left in the rail.
Fig. 17 shows an application of this invention to a method of testing in which electric current is passed transversely through the rail.
Fig. 18 is a transverse view through a rail head which is being tested by the system shown in Fig. 17.
Fig. 19 shows what may be considered a characteristic distribution of residual magnetism in the vicinity of flaws.
Figs. 20–23, inclusive, show various ways in which the detecting coils may be positioned with respect to the rail head in order to locate the characteristic magnetic conditions in the vicinity of flaws, whether that condition be produced by the electro-inductive or by the residual magnetism systems.
Fig. 25 shows still another modification of such a mount.

In some cases, it may be possible to dispense with the top pick-up 41, but preferably this pick-up is retained in order to be more certain of detecting fissures located near the outer side of the rail head. Of course, detecting coils may be located along this margin of the rail head or adjacent to the under surface thereof, as shown in Fig. 20; but the problem of avoiding obstructions in the rail is much more complicated on the outer side of the rail head than it is on the gauge half of the rail head.

Figure 7:
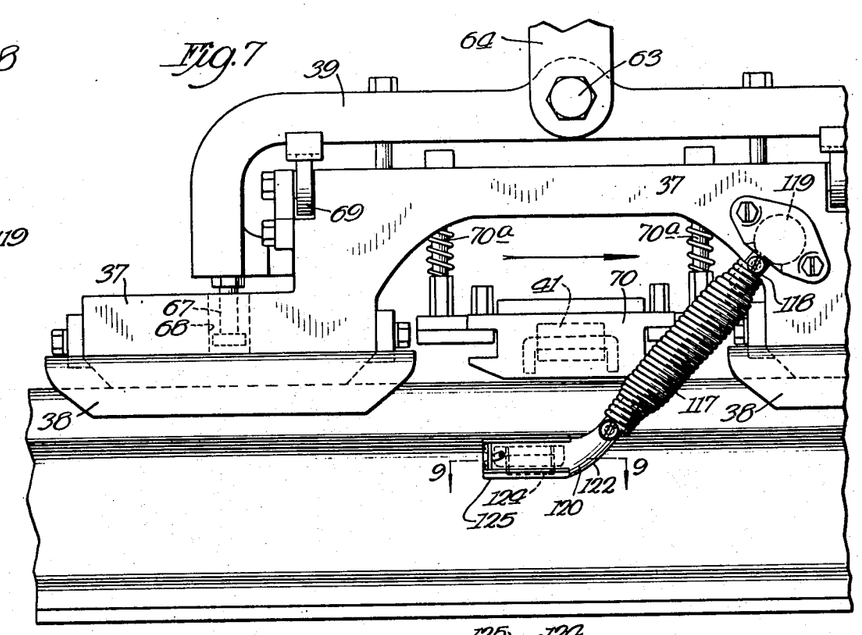
Fig. 7 is a side elevational view showing one form of mounting the detecting unit for cooperation with the under surface of the rail head.
Figure 8:
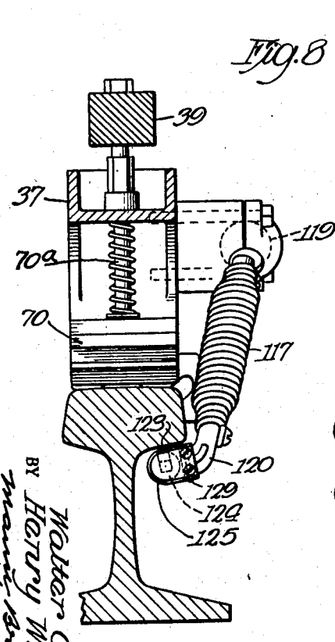
Fig. 8 is an end elevational view of the mount shown in Fig. 7.
Figure 9:
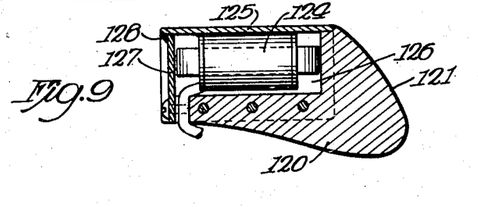
Fig. 9 is a horizontal sectional view taken on the line 9—9 of Fig. 7.

Underneath mount (Figs. 7–9, inclusive)

Although the problem of getting past track obstacles is more complicated with an underneath mount, such as shown in Figs. 7–9, inclusive, than a gauge mount such as shown in Figs. 1–6, inclusive, there are certain inherent advantages in having the detector coil beneath the rail head. In the first place, it is farther away from the magnetic conditions which are created by imperfections on the top surface of the rail. In the second place, the detector coil is positioned closer to the center line of the rail, where it has a better opportunity of locating fissures in the outer portion of the rail head.

A simple mount for an underneath coil is shown in Figs. 7–9, inclusive, and it consists of a tightly coiled spring 117 fastened at its upper end to a rod 118, which has a ball and socket connection 119 with the carriage 37. The lower end of the spring 117 is secured to a cam-shaped casting 120, preferably of manganese steel, stainless steel, or some other wear-resistant material. The horizontal sectional shape of the casting 120 is shown in Fig. 9, the cam face 121 serving to force the body 120 inwardly away from the rail whenever a track obstacle, such as a joint bar, frog, or the like, is encountered. The spring 117 readily accommodates this movement, and the cam face 122 causes the body 120 to move upwardly a sufficient distance to ride in the flange way adjacent to the gauge side of the rail head until the obstacle is passed, whereupon the spring 117 moves the body 120 back to its normal running position. The ball and socket adjustment 119 permits the mounting to be adjusted so that the detecting unit is normally spaced a slight distance from the under surface 123 of the rail head, or, if desired, it may be adjusted so that there is a light running contact with this surface of the rail head.

The detector coil 124 is housed within the body 120, and it may have the same operating characteristics that were described for the coil 46. The legs 110 of the core are turned upwardly, as shown in Fig. 8, and the coil is enclosed by a stainless steel tube 125, which, after being filled with wax 126 to hold the coil 124 in place, is closed by a plate 127 and soldered to the tube 125, as indicated at 128. The tube 125 may be secured to the body 120 by screws or rivets 129, as shown in Figs. 8 and 9. Again, the regular pick-up 41 on the top surface of the rail may be used, or not, as desired.

It should be noted that the manner in which the detector carriage is raised and lowered with respect to the rail (as shown in Figs. 5 and 6 and heretofore described) permits the inwardly extending portion of the detecting unit mount (i. e., the coil 124 with its housing 125) to clear the rail head as the carriage is lowered to the rail, after which the lateral movement of the carriage outwardly, bringing the gauge runners 38 into contact with the rail head, moves the detecting unit into operative position on the under surface of the rail head.

Underneath mount—feeler type (Figs. 10–15, inclusive)

Another way in which the detecting unit that is being carried underneath the rail head may be moved to a position of safety while it is passing track obstacles is shown in Figs. 11–15, inclusive. Here, the detector coil, indicated at 135, is carried in a small box housing 136 formed of stainless steel or other wear-resistant material and secured by screws 137 to a small pivot block 138 hinged at 139 to the lower end of a vertical arm 140. The housing 136 is yieldingly urged to its normal operating position (Fig. 13) by means of a spring 141, and the exact angle which the housing makes with respect to the arm 140 is controlled by an adjustable stop 142 cooperating with a lug 143, formed on the pivot block 138.

Figures 10, 11, 12:
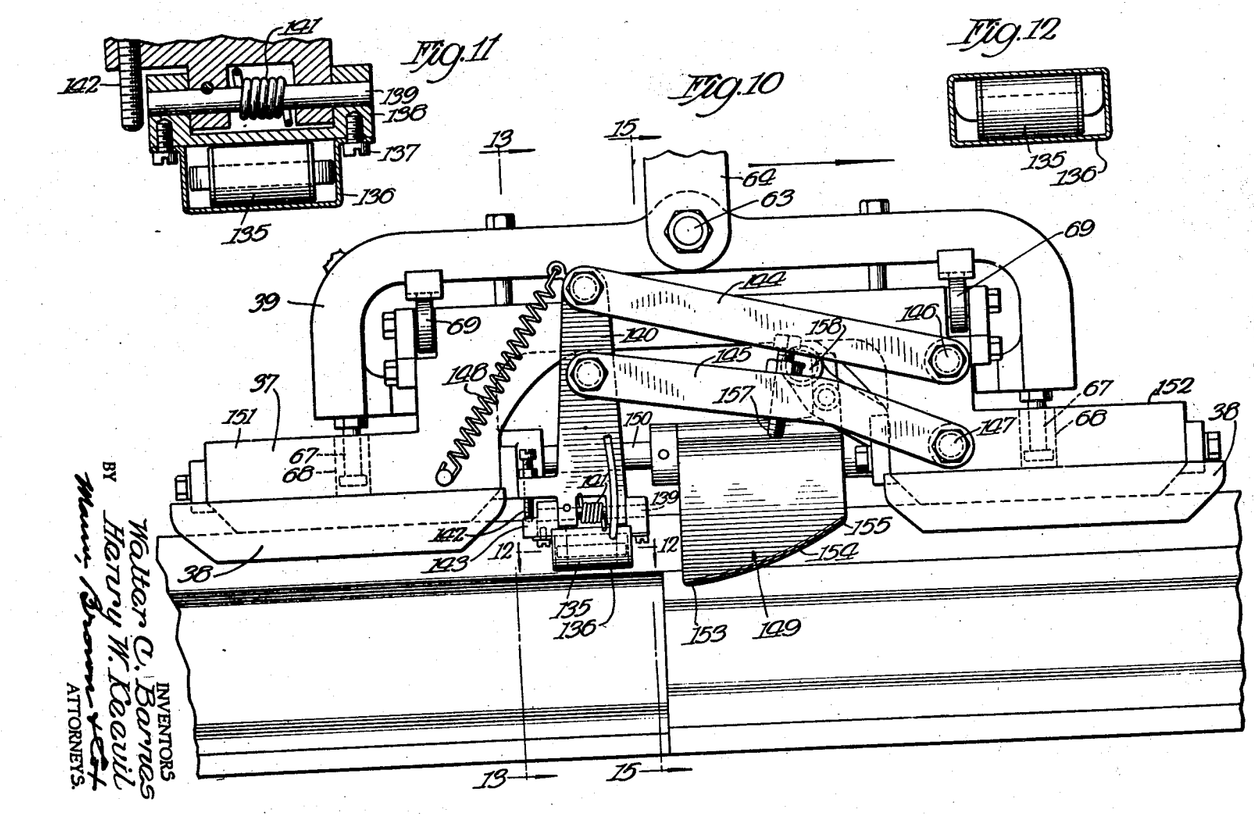
Fig. 10 is a side elevational view showing a detecting unit mount which is movable in response to a feeler arm to avoid obstructions along the rail.
Fig. 11 is a fragmentary vertical sectional view taken on the line 11—11 of Fig. 14.
Fig. 12 is a horizontal sectional view taken on the line 12—12 of Fig. 10.
Figure 12:
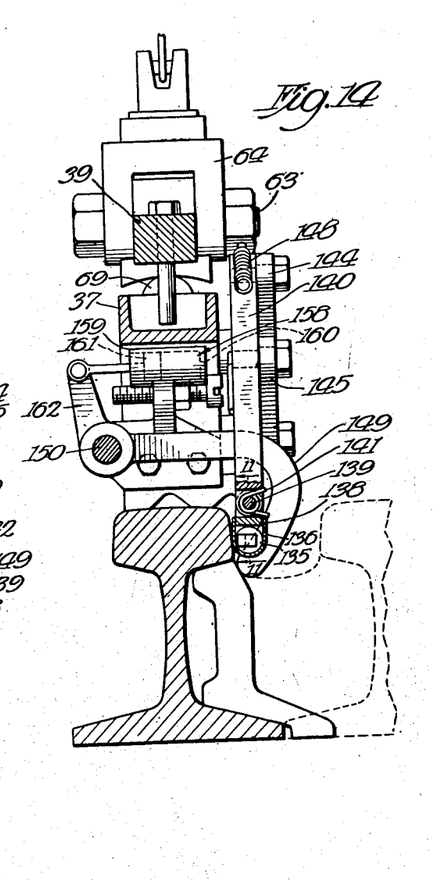

The arm 140 is carried by parallel links 144 and 145, which are pivotally secured to the carriage 37 at 146 and 147 respectively. The arm 140 is yieldingly urged downwardly by a spring 148 extending from the top of the arm 140 to an adjacent portion of the carriage.

A feeler plate 149 is keyed to a horizontal shaft 150 which extends between the two legs 151 and 152 of the detector carriage, and the plate is so shaped that it projects around the rail head and has the trailing portion 153 of its cam face 154 positioned in advance of and directly in the path of the detecting unit while traveling adjacent to the under surface of the rail head.

As shown in Fig. 10, the cam face 154 is curved upwardly in side elevation so that its forward face 155 rides high in the flange way which exists in all track. This flange way is normally at least two inches in width, and ordinarily extends at least to the lower corner 156 of the gauge side of the rail head. Whenever the feeler 149 strikes an obstacle, such as a rail joint, frog, or the like, the cam face 154 causes the feeler to move upwardly about its pivot shaft 150, and the upper surface of the feeler 149 (see Fig. 15) strikes an adjustable stop 157, carried by the lower link 145 supporting the arm 140. The link 145 is thereby moved upwardly, carrying with it the arm 140 against the tension of the spring 148; and, since the rail head prevents the coil 135 from moving directly upwardly, the housing 136 is caused to rotate about the pivot 139 to the position shown in Fig. 14, in which position it is not only within the flange way that is clear of obstacles but is in testing position during the entire time that it has been moved from its normal position beneath the rail head.

As soon as the trailing portion 153 of the feeler 149 has cleared the obstacle, it tends to fall by its own weight to its normal position beneath the rail head, but its action is retarded by a dashpot 158, so that the arm 140 is not lowered until it also has had an opportunity to clear the obstacle. Obviously, as soon as the arm 140 is lowered sufficiently to enable the housing 136 for the detecting unit to rotate in a clockwise direction about the pivot 139, it will do so, again setting itself to the position shown in Fig. 13.

The dashpot 158 may be of any suitable form, the one here shown consisting of a cylinder 159 provided with a restricted opening 160 at its end for slowly releasing air from the cylinder when the piston 161 is moved to the right (Fig. 14) as the arm 162, integral with the feeler 149, is moved in that direction. If desired, the dashpot may provide for unrestrained movement of the piston 161 to the left, although this is not necessary because the feeler 149 is always lifted to its upper position by a positive force which readily overcomes the resistance of the dashpot.

*Underneath mounts (Figs. 24 and 25)*

The underneath mount of the detecting unit 163, shown in Fig. 24, is somewhat similar to the one shown in Figs. 7–9, inclusive; but, here, the detecting unit is mounted on an arm 164, which is pivoted at 165 to a bracket 166 carried by the carriage 37, the pivot 165 lying on an axis 167, which is substantially normal to the plane which includes the under surface 123 of the rail head. Whenever the detecting unit 163 strikes an obstacle beneath the rail head, the rotation of the arm 164 about the pivot 165 will always insure that it can get out from under the rail head without jamming.

After the unit 163 has been rotated about the pivot 165 until it is clear of the rail head, it may be moved upwardly by the track obstacle about a horizontal pivot 168 and against the tension of spring 169, which normally holds the jointed arm 164 in the position shown in Fig. 24 against a stop 170. The arm is yieldingly urged forwardly against a stop (not shown) by a spring 171 extending from the arm 164 to a fixed portion of the bracket 166.

Figure 13:
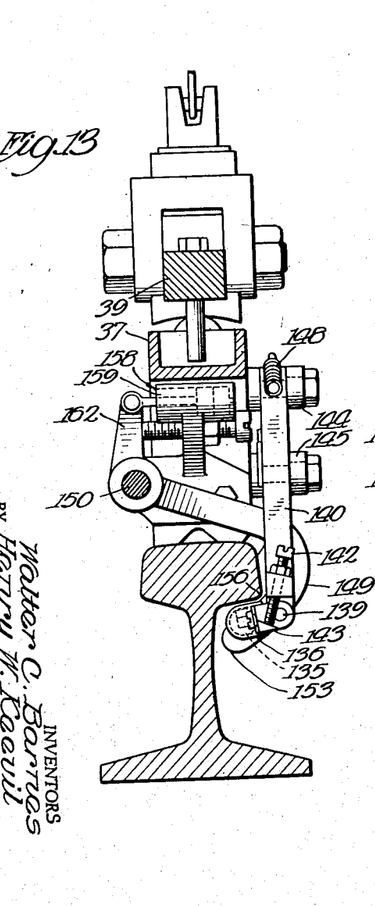
Figure 15:
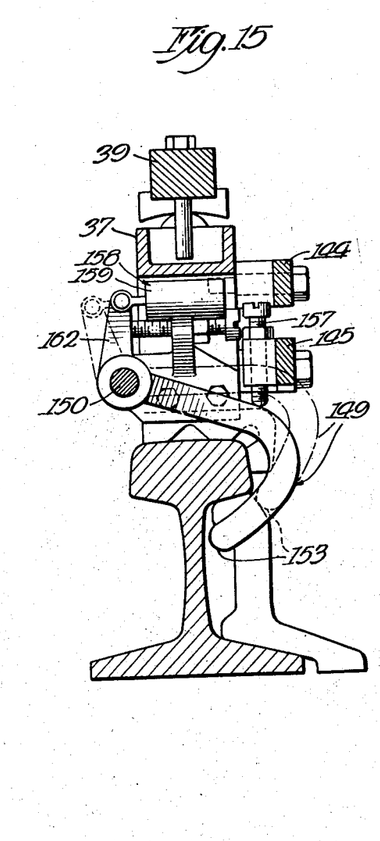
Fig. 15 is a sectional view taken on the line 15—15 of Fig. 10.

Instead of using a dashpot, such as shown at 158 in Figs. 13 and 14, the return of the arm 140 in the embodiment of the invention shown in Figs. 10–15, inclusive, to normal running position, as shown in Fig. 13, may be delayed by a second feeler 172, which continues to ride on the obstacle—in this instance, a joint bar 173—after the front feeler 149 has passed over the obstacle. When it finally clears the obstacle, it is perfectly safe for the arm 140 to be again lowered.

OTHER MODIFICATIONS

The invention is not limited to use with the residual magnetism system of testing, for it may be used with the electro-inductive system as well. For example, in Fig. 16 there is diagrammatically shown a pair of spaced current brushes 174 and 175, which deliver uni-directional direct current to the portion of the rail between the brushes 174 and 175 by a generator 176. The detector carriage in the electro-inductive system is mounted between the current brushes and may carry any of the types of detecting units that are shown in the drawings and are herein described, although it is necessary with the electro-inductive system to employ two detector coils 177 connected in series opposition in order to balance out the variations in the strength of the current passing through the rail. The coils may be placed on the gauge side of the rail head or underneath the rail head, and they may be positioned vertically, as shown by the coils 177, or horizontally, as indicated by the coils 178. Likewise, the detecting coils, instead of being placed between the current brushes 174 and 175, where they are responsive to variations in the magnetic field around the rail, may be placed behind the rear current brush 175, where they pick up residual magnetism in the vicinity of flaws. The coils 178 are shown in this position in Fig. 16. It should also be understood that both vertical and horizontal coils, positioned along the gauge side of the rail head or beneath the rail head, may be used between the current brushes or in rear of the current brushes, as desired.

When residual magnetism is to be established by passing electrical current through the rail, it is sometimes best to pass the current transversely through the rail head, as shown in Figs. 17 and 18, in order that the lines of flux set up by the current will be in the right direction to polarize the faces of transverse fissures, one of which is shown at 179 in Fig. 17. Obviously, the pick-up coil 180 may be positioned on the top surface of the rail, along the gauge edge or underneath the rail head, as may be desired.

The distribution of magnetic flux around a transverse fissure is indicated generally in Fig. 19, and Figs. 20-23, inclusive, show various ways in which the characteristic magnetic flux conditions around the fissure may be located by induction coils used in accordance with this invention. For example, they may be longitudinal coils, as shown at 181 in Fig. 20, and they may be adjacent to the gauge side, the outer side, or underneath one or the other of the under surfaces of the rail head. More than one coil may, of course, be employed, if desired, located in these positions. Or transverse coils 182 may be employed in any one or more of these positions, as shown in Fig. 21. In Figs. 22 and 23, a detector coil is shown which is positioned at an inclined angle with respect to all three axes XX, YY, and ZZ of the rail.

It will be understood that in all forms of the invention the regular pick-up 41 may be used with the gauge or underneath pick-ups if desired.

We claim:

1. Apparatus for progressively detecting flaws in rail comprising means for setting up characteristic magnetic conditions in the vicinity of flaws, a detecting unit responsive to said conditions movable along the rail, and means for supporting said unit where the unit will have its strongest magnetic coupling with the rail through a surface of the rail head lower than the top surface of the rail, thereby producing an indication when the device traverses said field whereby the unit is relatively unresponsive to magnetic conditions set up by surface imperfections on the top surface of the rail head, said unit including a core having poles lying adjacent to the rail head.

2. Apparatus for progressively detecting flaws in rail comprising means for setting up characteristic magnetic conditions in the vicinity of flaws, a detecting unit responsive to said conditions movable along the rail, and means for supporting said unit on the gauge side of the rail head where the unit will have its strongest magnetic coupling with the rail through a surface of the rail head lower than the top surface of the rail, thereby producing an indication when the device traverses said field whereby the unit is relatively unresponsive to magnetic conditions set up by surface imperfections on the top surface of the rail head.

3. Apparatus for progressively detecting flaws in rail comprising means for setting up characteristic magnetic conditions in the vicinity of flaws, a detecting unit responsive to said conditions movable along the rail, and means for supporting said unit where the unit will have the strongest magnetic coupling with the rail through an under surface of the rail head whereby the unit is unresponsive to magnetic conditions set up by surface imperfections on the top surface of the rail head.

4. Apparatus for progressively detecting flaws in rail comprising means for setting up characteristic magnetic conditions in the vicinity of flaws, a detecting unit responsive to said conditions movable along the rail, said detecting unit including an induction coil positioned with its longitudinal axis substantially parallel to the rail, and means for supporting said unit where the unit will have its strongest magnetic coupling with the rail through a surface of the rail head lower than the top surface of the rail, thereby producing an indication when the device traverses said field whereby the unit is relatively unresponsive to magnetic conditions set up by surface imperfections on the top surface of the rail head.

5. Apparatus for progressively detecting flaws in rail comprising means for setting up characteristic magnetic conditions in the vicinity of flaws, a detecting unit responsive to said conditions movable along the rail, and means for supporting said unit where the unit will have its strongest magnetic coupling with the rail through a surface of the rail head lower than the top surface of the rail, thereby producing an indication when the device traverses said field whereby the unit is relatively unresponsive to magnetic conditions set up by surface imperfections on the top surface of the rail head, said supporting means including a carriage adapted to travel along the rail, and means engaging the gauge side of the rail head for maintaining the carriage in uniform lateral position with respect to the rail head.

6. Apparatus for progressively detecting flaws in rail comprising means for setting up characteristic magnetic conditions in the vicinity of flaws, a detecting unit responsive to said conditions movable along the rail, means for supporting said unit adjacent to the rail head, but below the top surface thereof, whereby the unit is unresponsive to magnetic conditions set up by surface imperfections on the top surface of the rail head, said supporting means including a carriage adapted to travel along the rail, and means engaging the gauge side of the rail head for maintaining the carriage in uniform lateral position with respect to the rail head, said detecting unit and gauge-engaging means being shaped, sized, and positioned so that they may ride through all track obstructions in the flange way necessarily provided on the gauge side of standard track.

7. Apparatus for progressively detecting flaws in rail comprising means for setting up characteristic magnetic conditions in the vicinity of flaws, a detecting unit responsive to said conditions movable along the rail, and means for supporting said unit on the gauge side of the rail head where the unit will have its strongest magnetic coupling with the rail through a surface of the rail head lower than the top surface of the rail, thereby producing an indication when the device traverses said field whereby the unit is relatively unresponsive to magnetic conditions set up by surface imperfections on the top surface of the rail head, said supporting means including a pendulum mounting for the detecting unit, resilient means urging the pendulum mounting in one direction, and a stop limiting movement of the pendulum mounting in said direction.

8. Apparatus for detecting flaws in rail comprising a carriage adapted to travel along the rail, means for maintaining the carriage in uniform lateral position with respect to the gauge side of the rail head, and a detecting unit mounted on the carriage for cooperation with the under surface of the rail head, the mounting for said detecting unit including a tightly coiled spring yieldable in all directions in which the spring may be subjected to forces caused by the detecting unit striking track obstructions.

9. Apparatus for detecting flaws in rail comprising a carriage adapted to travel along the rail, means for maintaining the carriage in uniform lateral position with respect to the gauge side of the rail head, and a detecting unit mounted on the carriage for cooperation with the under surface of the rail head, the mounting for said detecting unit including a tightly coiled spring yieldable in all directions in which the spring may be subjected to forces caused by the detecting unit striking track obstructions, said spring being inclined upwardly and forwardly and having its upper end mounted in an adjustable socket whereby the position of the detecting unit with respect to the rail head may be adjustably determined.

10. Apparatus for detecting flaws in track in which the under surface of the rail head is obstructed at intervals by joint bars, switch points, highway crossings, and the like, but which always has a flange way of limited size provided adjacent to the gauge side of the rail, the combination of a car adapted to travel on said track, a detecting unit carried by the car and mounted so that it normally cooperates primarily with the under surface of the rail head on the gauge side of the rail center line, and means associated with the detecting unit mount for automatically raising the detecting unit into cooperative relationship with the gauge side of the rail head whenever the under surface of the rail head is obstructed by rail joints or the like, said detecting unit being adapted to ride in the flange way adjacent to the gauge side of the rail head whenever the detecting unit is moved into cooperative relationship with the gauge side of the rail head.

11. Apparatus for detecting flaws in track in which the under surface of the rail head is obstructed at intervals by joint bars, switch points, highway crossings, and the like, but which always has a flange way of limited size provided adjacent to the gauge side of the rail, the combination of a car adapted to travel on said track, a detecting unit carried by the car and mounted so that it normally cooperates primarily with the under surface of the rail head on the gauge side of the rail center line, and means mounted in advance of the detecting unit for locating obstructions to the normal path of the detecting unit and for thereupon raising the detecting unit from its position under the rail head to a position alongside the gauge side of the rail head.

12. Apparatus for detecting flaws in track in which the under surface of the rail head is obstructed at intervals by joint bars, switch points, highway crossings, and the like, but which always has a flange way of limited size provided adjacent to the gauge side of the rail, the combination of a car adapted to travel on said track, a detecting unit carried by the car and mounted so that it normally cooperates primarily with the under surface of the rail head on the gauge side of the rail center line, means mounted in advance of the detecting unit for locating obstructions to the normal path of the detecting unit and for thereupon raising the detecting unit from its position under the rail head to a position alongside the gauge side of the rail head, and means yieldingly urging the detecting unit toward its normal operating position under the rail head, and means for retarding the movement of the detecting unit to said normal operating position after the obstruction locating means has passed the obstruction.

13. Apparatus for detecting flaws in track in which the under surface of the rail head is obstructed at intervals by joint bars, switch points, highway crossings, and the like, but which always has a flange way of limited size provided adjacent to the gauge side of the rail, the combination of a car adapted to travel along said track, a carriage suspended from the car, means for raising and lowering the carriage with respect to the rail, a gauge runner for laterally positioning the carriage with respect to the rail, a detecting unit mounted on the carriage normally positioned adjacent to the under surface of the rail head when testing for flaws in the rail, a horizontal shaft on the carriage, a feeler mounted on the shaft and positioned in advance of the detecting unit adapted to locate and be moved upwardly when it encounters obstructions underneath the rail head in the path of the detecting unit, means responsive to the feeler for moving the detecting unit from its position under the rail head to a position adjacent to the gauge side of the rail head whereby it may travel in said flange way and still be in operative position to test the rail for flaws, and means for returning the detecting unit to its normal operating position below the rail head after the feeler returns to its normal position.

14. Apparatus for detecting flaws in rail comprising a car, a detector carriage supported from the car, means for raising and lowering the carriage with respect to the rail, said means being constructed and arranged so that the carriage when lowered to operative position on the rail strikes the rail while positioned laterally inwardly from its normal running position on the rail and is then moved laterally outwardly to said normal operating position, a detecting unit mounted on the carriage including a substantially vertical arm positioned when the carriage is in its running position closely adjacent to the gauge side of the rail head, and means for mounting the detecting unit on the lower end of said arm in position to cooperate primarily with the under surface of the rail head.

15. The method of progressively detecting flaws in the head of a rail which consists in conditioning the head by setting up characteristic magnetic conditions in the head in the vicinity of flaws, and then locating said flaws by searching for the characteristic magnetic conditions by moving a flux responsive device along the rail in a path where the device will have it strongest magnetic coupling with the rail through a surface of the rail head lower than the top surface of the rail, thereby producing an indication when the device traverses said field.

16. Apparatus for progressively detecting flaws in rail comprising means for setting up characteristic residual magnetic conditions in the vicinity of flaws, a detecting unit responsive to said conditions movable along the rail, and means for supporting said unit away from said first mentioned means and where the device will have its strongest magnetic coupling with the rail through a surface of the rail head lower than the top surface of the rail, thereby producing an indication when the device traverses said field, whereby the unit is relatively unresponsive to magnetic conditions set up by surface imperfections on the top surface of the rail, and is affected only by magnetic conditions remaining in the vicinity of flaws after the removal of said first mentioned means.

17. The method of progressively detecting flaws in the head of a rail which consists in conditioning the head by passing along the rail means for passing a strong magnetic flux through the rail, and then, after the conditioning means has moved along, searching the head for characteristic flaw-indicating magnetic conditions by moving a flux responsive device along the rail in a path where the device will have its strongest magnetic coupling with the rail through a surface of the rail head lower than the top surface of the rail, thereby producing an indication when the device traverses said field.

18. The method of progressively detecting flaws in the head of a rail which consists in conditioning the head by setting up characteristic magnetic conditions in the head in the vicinity of flaws and locating said flaws and surface imperfections on the top of the rail by searching for the characteristic magnetic conditions by two separate means positioned in close magnetic coupling to the head and giving separate indications, one of said means being close to the upper surface of the head, and the other of said means being close to another surface of the head lower than the upper surface, whereby said flaws and said surface imperfections may be distinguished by differences in the indications given by said separate means.

19. Apparatus for progressively detecting flaws in the head of a rail comprising means for setting up characteristic magnetic conditions in the vicinity of flaws and other magnetic conditions in the vicinity of surface imperfections, two separate detecting units responsive to said conditions and movable together along the rail, means for supporting one of said units adjacent to the upper surface of the rail head and for supporting the other of said units adjacent to another surface of the rail head lower than the upper surface, and separate means for producing juxtaposed records to indicate the effect of said separate detecting units whereby flaws may be distinguished from said surface imperfections by differences in the indications given by said separate means.

20. The method of detecting flaws in a ferromagnetic rail in track which consists in subjecting the rail to an energizing force which when removed leaves a residual magnetic field in the vicinity of such flaws, and then locating said field by moving a flux responsive device along the rail in a path where the device will have its strongest magnetic coupling with the rail through the surface of the rail head at the gauge side thereof and lower than the top surface of the rail head, thereby producing an indication when the device traverses said field.

21. The method of detecting flaws in a ferromagnetic rail in track which consists in subjecting the rail to an energizing force which when removed leaves a residual magnetic field in the vicinity of such flaws, and then locating said field by moving a flux responsive device along the rail in a path where the device will have its strongest magnetic coupling with the rail through an undersurface of the rail head, thereby producing an indication when the device traverses said field.

22. The method of detecting flaws in a ferromagnetic rail in track which consists in subjecting the rail to an energizing force which when removed leaves a residual magnetic field in the vicinity of such flaws, and then locating said field by moving a flux responsive device along the rail in a path where the device will have its strongest magnetic coupling with the rail through a surface of the rail head lower than the top surface of the rail, thereby producing an indication when the device traverses said field.

23. The method of progressively detecting flaws in a rail which has been conditioned by setting up characteristic magnetic conditions in the vicinity of flaws which consists in searching for said flaws by moving a flux responsive device along the rail in a path where the device will have its strongest magnetic coupling with the rail through the surface of the rail head at the gauge side thereof and lower than the top surface of the rail head, thereby producing an indication when the device traverses said field.

24. The method of progressively detecting flaws in rail which has been conditioned by the passage of a strong externally applied magnetic flux longitudinally therethrough and the removal of the externally applied flux to set up and leave characteristic residual magnetic conditions in the vicinity of flaws, which comprises moving a longitudinal flux responsive device along the rail in a path where the device will have its strongest magnetic coupling with the rail through the surface of the rail head at the gauge side thereof and lower than the top surface of the rail head thereby producing an indication when the device traverses said field.

25. The method of progressively detecting flaws in rail which consists in conditioning the rail by progressively passing along the rail means for passing a strong magnetic flux longitudinally through the rail, and then, after the rail conditioning means has moved along, testing the rail for traces of residual magnetism by moving a longitudinal flux responsive device along the rail in a path where the device will have its strongest magnetic coupling with the rail through a surface of the rail head lower than the top surface of the rail, thereby producing an indication when the device traverses said field, whereby false indications caused by shelly spots, burns, corrugations, etc., are avoided.

26. The method of progressively detecting flaws in the head of a rail which has been conditioned by setting up characteristic magnetic conditions in the head in the vicinity of flaws and which is characterized by having surface irregularities along its top surface which are not along lower surfaces of the rail head which consists in locating said flaws and also some surface irregularities on the top of the rail by searching for the characteristic magnetic conditions by moving detector means positioned in close magnetic coupling to the top surface of the rail head and responsive to the entire cross-section of the rail head, and simultaneously moving along the rail detector means in close magnetic coupling to a lower surface of the rail head whereby said flaws and said surface imperfections may be distinguished by the differences in the responsiveness of the two detector means.

27. Apparatus for progressively detecting flaws in the head of a rail which has a top surface subject to certain surface irregularities and a lower surface not subject to said irregularities and which has been conditioned by setting up characteristic magnetic conditions in the vicinity of flaws, including a detecting unit substantially responsive to the entire rail head and movable along the rail head closely coupled thereto through the top surface thereof and an additional detecting unit movable along the rail head closely coupled thereto through said lower surface thereof, means for supporting said units in their respective positions and for moving them longitudinally along the rail in such positions whereby said flaws and said surface imperfections may be distingiushed by the differences in the responsiveness of said units.

WALTER C. BARNES.
HENRY W. KEEVIL.